United States Patent
Sano

(10) Patent No.: US 11,477,425 B2
(45) Date of Patent: Oct. 18, 2022

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yasumasa Sano, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 244 days.

(21) Appl. No.: 16/992,221

(22) Filed: Aug. 13, 2020

(65) Prior Publication Data

US 2021/0289184 A1 Sep. 16, 2021

(30) Foreign Application Priority Data

Mar. 13, 2020 (JP) .............. JP2020-043749

(51) Int. Cl.
*H04N 9/64* (2006.01)
*G06T 7/90* (2017.01)
*H04N 9/68* (2006.01)

(52) U.S. Cl.
CPC .............. *H04N 9/646* (2013.01); *G06T 7/90* (2017.01); *H04N 9/68* (2013.01); *G06T 2207/10024* (2013.01)

(58) Field of Classification Search
CPC ........ H04N 9/646; H04N 9/68; H04N 1/6052; H04N 1/6019; H04N 1/6016; G06T 7/90; G06T 2207/10024
See application file for complete search history.

(56) References Cited

U.S. PATENT DOCUMENTS 8,027,060 B2 9/2011 Kaneko
2008/0239349 A1* 10/2008 Kaneko ................. H04N 1/646
358/1.9

FOREIGN PATENT DOCUMENTS

JP 2008-252684 A 10/2008
JP 2017-216560 A 12/2017

* cited by examiner

*Primary Examiner* — Christopher Wait
(74) *Attorney, Agent, or Firm* — Oliff PLC

(57) ABSTRACT

An image processing apparatus includes: an input device to which images before color conversion and images after color conversion are input; and a processor. The processor is configured to execute a program to perform color conversion on a sample image using color conversion characteristics prepared by inputting sets of the images before color conversion and the images after color conversion to the input device, specify a portion at which a tone jump is caused from the sample image after color conversion, and acquire a set of an image before color conversion and an image after color conversion corresponding to the portion at which the tone jump is caused from the sets, to prepare the color conversion characteristics again using the acquired set of images.

14 Claims, 8 Drawing Sheets

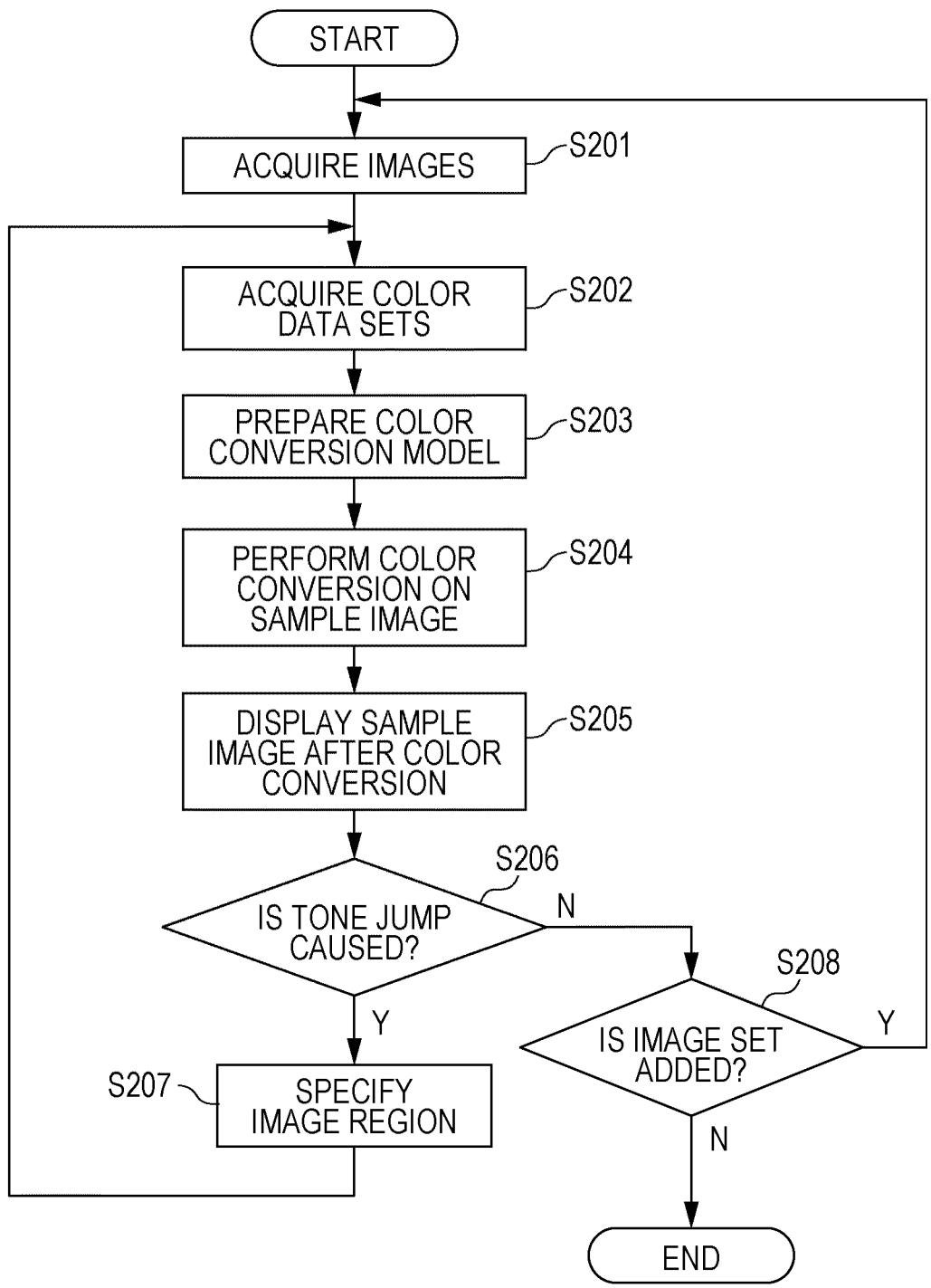

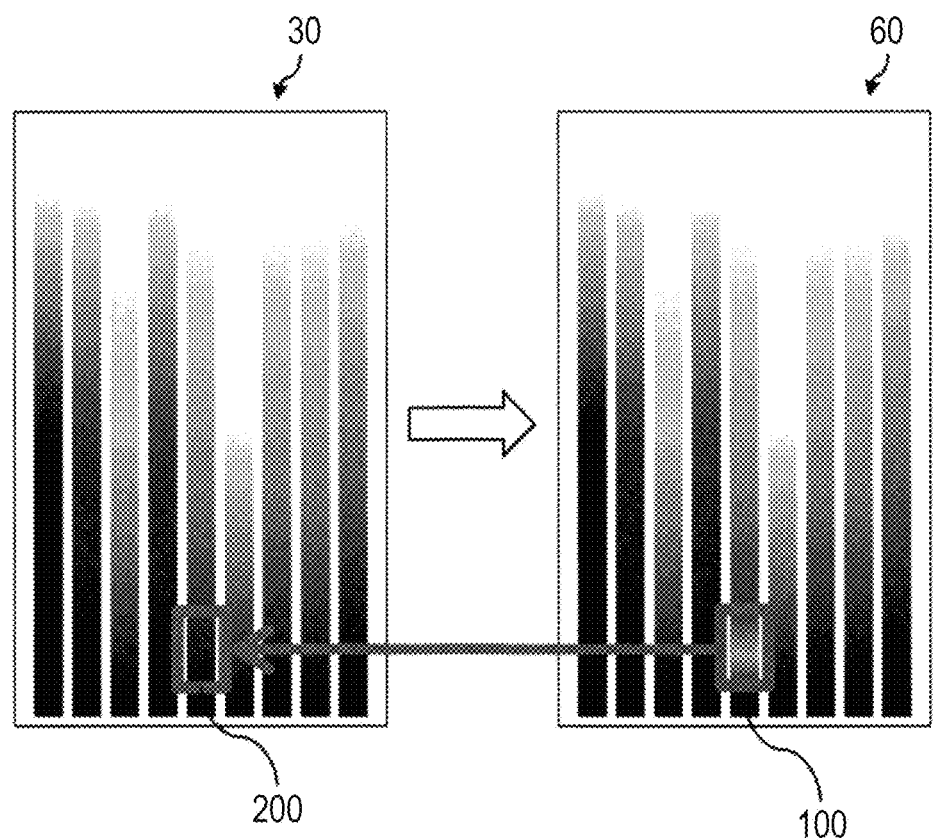

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-043749 filed Mar. 13, 2020.

BACKGROUND

(i) Technical Field

The present disclosure relates to an image processing apparatus and a non-transitory computer readable medium.

(ii) Related Art

There are an increasing number of users who capture and view digital images because of the widespread use of devices such as digital cameras, smartphones, and tablets. Various subjects are captured in the images in various environments under the influence of illumination light etc. Thus, the captured images are often different from what the users intended. Thus, the color tint etc. of the captured images is occasionally changed.

Japanese Unexamined Patent Application Publication No. 2017-216560 describes an image processing apparatus that is capable of preparing conversion relationship, where color adjustment precision is less likely to decrease, even if the color characteristics of an article are different or capturing conditions are different. The apparatus includes: a color data extraction unit that extracts a plurality of first color data, i.e., the color data in an area of interest of a first image that represents a color correction object, and a plurality of second color data corresponding to the area of interest in a second image that is different from the first image, the second color data being paired with the first color data; a color conversion model preparation unit that prepares a color conversion model that represents the relationship of the first and second color data thus extracted; and a conversion relationship preparation unit that prepares the conversion relationship for reproducing color adjustment of the first image on the basis of the color conversion model.

SUMMARY

In the case where there is a problem with the prepared color conversion characteristics, specifically a tone jump is caused in an image after color conversion, when color conversion characteristics are prepared by inputting images before color conversion and images after color conversion to a learning unit for machine learning, it is necessary to immediately improve such a tone jump.

Aspects of non-limiting embodiments of the present disclosure relate to providing a technique of improving color conversion characteristics in the case where a tone jump is caused in an image that results from color conversion performed using the color conversion characteristics.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including: an input device to which images before color conversion and images after color conversion are input; and a processor, in which the processor is configured to execute a program to perform color conversion on a sample image using color conversion characteristics prepared by inputting sets of the images before color conversion and the images after color conversion to the input device, specify a portion at which a tone jump is caused in the sample image after color conversion, acquire, from the sets, a set of an image before color conversion and an image after color conversion corresponding to the portion at which the tone jump is caused ; and prepare the color conversion characteristics again using the acquired set of images.

BRIEF DESCRIPTION OF THE DRAWINGS

An exemplary embodiment of the present disclosure will be described in detail based on the following figures, wherein:

FIG. 5 is a different process flowchart according to the exemplary embodiment;

FIGS. 7A and 7B illustrate extraction of an image region in which a tone jump is caused according to the exemplary embodiment.

DETAILED DESCRIPTION

Figure 1:
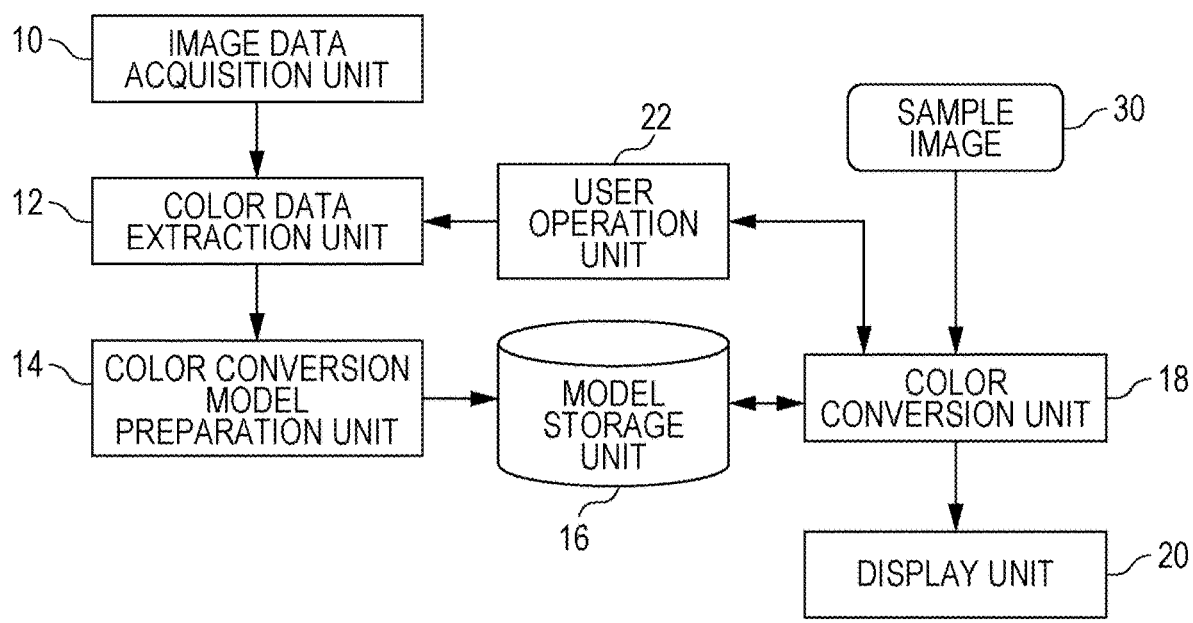
FIG. 1 is a functional block diagram of an image processing apparatus according to an exemplary embodiment.

An exemplary embodiment of the present disclosure will be described below with reference to the drawings.

<Basic Principle>

First, the basic principle will be described.

Color conversion characteristics (hereinafter referred to as a "color conversion model") may be prepared by performing machine learning using a plurality of sets of images before color conversion and images after color conversion as teacher data, and a desired image may be automatically subjected to color conversion using the prepared color conversion model.

However, the precision of the prepared color conversion model may not necessarily be sufficient, and color conversion may not be executed as intended by a user for all the colors. For example, there may be a case where color conversion is executed with sufficient precision for a certain color while tones are not smooth and a tone jump is caused for a different color. The "tone jump" refers to discontinuous variations in the lightness of a color or abrupt variations from a certain tone to a different tone. The factors of the tone jump include teacher data being insufficient or inappropriate for a color portion at which the tone jump is caused so that the precision of machine learning is not sufficient.

Thus, in the case where a color conversion model is prepared, it is necessary to check whether or not there is any problem with the prepared color conversion model and, if there is any problem, specify a color portion with the problem and prepare the color conversion model again, before executing color conversion by inputting the actual image to be subjected to color conversion.

Thus, in the present exemplary embodiment, in the case where a color conversion model is prepared, first, color conversion is performed by applying the color conversion model to a sample image to check whether or not there is any program with the color conversion model using the sample image after color conversion. The "sample image" refers to an image to be subjected to color conversion on a trial basis for the purpose of checking the precision of a color conversion model, rather than the actual image to be subjected to color conversion. The sample image includes a single color or a plurality of colors arranged under certain rules. While the sample image may be any image, the sample image is preferably a gradation image, more preferably a gradation image in a plurality of colors, for example. This is because a gradation image allows easy visual recognition of the presence or absence of a tone jump after color conversion, and a gradation image in a plurality of colors allows easy visual recognition of what color a tone jump is caused in.

In the case where any problem is found with the color conversion model from the sample image after color conversion, the location of the problem, specifically the location at which a tone jump is caused, is specified, and a color data set at the specified location is acquired from the original teacher data. The location at which a tone jump is caused may be specified by a user visually recognizing the sample image after color conversion.

The present exemplary embodiment will be described in detail below.

<Configuration>

FIG. 1 is a functional block diagram of an image processing apparatus according to the present exemplary embodiment. The image processing apparatus includes an image data acquisition unit 10, a color data extraction unit 12, a color conversion model preparation unit 14, a model storage unit 16, a color conversion unit 18, a display unit 20, and a user operation unit 22.

The image data acquisition unit 10 acquires an image designated by a user. The user designates a set of images before color conversion (hereinafter referred to as "pre-conversion images") and images after color conversion (hereinafter referred to as "post-conversion images" as teacher data which are necessary to prepare a color conversion model through machine learning. The image data acquisition unit 10 acquires the set of such images.

The color data extraction unit 12 extracts a plurality of color data sets in a region of interest from the set of the pre-conversion images and the post-conversion images which is acquired by the image data acquisition unit 10. That is, the color data extraction unit 12 extracts data sets including color data in a region of interest of the pre-conversion images (i.e. color data before color conversion) and color data in the same region of interest of the post-conversion images (i.e. color data after color conversion). The region of interest is a region that serves as a reference in preparing a color conversion model. While the region of interest may be set as desired, the region of interest may be a region designated by the user, or may be a specific image region set in advance. Alternatively, the region of interest may be a region in which a principal subject is present by default.

The color conversion model preparation unit 14 prepares a color conversion model by performing machine learning by inputting the color data sets which are extracted by the color data extraction unit 12 to a learning unit as teacher data. The "color conversion model" indicates the relationship between information on images before color conversion and information on images after color conversion. The "color conversion model" may be expressed as a function that represents the relationship between the information on images before color conversion and the information on images after color conversion. When color conversion vectors that have the information on images before color conversion as the start point and that have the information on images after color conversion as the end point are considered, the "color conversion model" is a collection of such color conversion vectors (color conversion vector group). For example, in the case where the image information is RGB data which are composed of red (R), green (G), and blue (B), and when the information on images before color conversion is defined as (Ra, Ga, Ba) and the information on images after color conversion is defined as (Rb, Gb, Bb), the "color conversion model" represents the relationship of conversion between (Ra, Ga, Ba) and (Rb, Gb, Bb). The "conversion relationship" indicates conversion information for converting the information on images before color conversion into the information on images after color conversion. The conversion relationship may be prepared as a look-up table (LUT). The LUT may be a multi-dimensional LUT, or may be a one-dimensional LUT. The conversion relationship may be prepared as a multi-dimensional matrix, rather than an LUT.

The conversion relationship is information for converting, in the case where the image information is RGB data, the information on images before color conversion (Ra, Ga, Ba) into the information on images after color conversion (Rb, Gb, Bb) as follows:

(Ra, Ga, Ba)→(Rb, Gb, Bb)

The use of this conversion relationship allows reproduction of color conversion that is similar to the color conversion performed previously. That is, when there occurs new information on images before color conversion, information on images after color conversion may be generated by performing color conversion that is similar to the color conversion performed previously by performing color conversion using the conversion relationship.

In the case where the conversion relationship is a multi-dimensional LUT, the conversion relationship is a three-dimensional LUT, and directly converts (Ra, Ga, Ba) into (Rb, Gb, Bb). That is, the conversion relationship performs the following conversion:

(Ra, Ga, Ba)→(Rb, Gb, Bb)

In the case where the conversion relationship is a one-dimensional LUT, meanwhile, the conversion relationship performs conversion for each of R, G, and B. That is, the conversion relationship performs the following conversion:

Ra→Rb
Ga→Gb
Ba→Bb

While conversion is performed in the RGB color space in the present exemplary embodiment, conversion may be performed in a different color space such as the CMYK color space. In this case, the image information is CMYK data which are composed of cyan (C), magenta (M), yellow (Y), and black (K). In the case where the conversion relationship is a multi-dimensional LUT, the conversion relationship is a four-dimensional LUT, and converts the information on images before color conversion (Ca, Ma, Ya, Ka) into the information on images after color conversion (Cb, Mb, Yb, Kb) as follows:

(Ca, Ma, Ya, Ka)→(Cb, Mb, Yb, Kb)

In the case where the conversion relationship is a one-dimensional LUT, meanwhile, the conversion relationship performs conversion for each of C, M, Y, and K. That is, the conversion relationship performs the following conversion:

Ca→Cb
Ma→Mb
Ya→Yb
Ka→Kb

The color conversion model which is prepared by the color conversion model preparation unit 14 is stored in the model storage unit 16. In the case where the color conversion model is a three-dimensional LUT, the three-dimensional LUT is stored in the model storage unit 16.

The color conversion model preparation unit 14 may prepare a continuous color conversion relationship by interpolating, as appropriate, a color conversion relationship with no color data set in the prepared color conversion model using a known interpolation technique. Specifically, in the case where a three-dimensional LUT prescribes (Ra1, Ga1, Ba1)→(Rb1, Gb1, Bb1) and
(Ra2, Ga2, Ba2)→(Rb2, Gb2, Bb2), a color conversion relationship may be prepared through linear interpolation or non-linear interpolation for image information between (Ra1, Ga1, Ba1) and (Ra2, Ga2, Ba2), for example.

The color conversion unit 18 executes color conversion on an input image using the color conversion model which is stored in the model storage unit 16, and displays a post-conversion image on the display unit 20. It should be noted, however, that the color conversion unit 18 executes color conversion on an input sample image 30 using the color conversion model in accordance with an operation from the user operation unit 22, and displays a sample image after color conversion on the display unit 20. The sample image 30 may be a gradation image in a plurality of colors, for example. The user visually recognizes the sample image after color conversion which is displayed on the display unit 20, and checks the presence or absence of a tone jump. If there is no tone jump, it is determined that the color conversion model which is stored in the model storage unit 16 is sufficiently precise. If there is a tone jump, on the other hand, the user operates the user operation unit 22 to specify an image region in which the tone jump is caused. While an image region in which the tone jump is caused may be specified by the user setting the position and the size of a rectangular region using an input device such as a mouse, for example, the present disclosure is not limited thereto. Information on the image region which is specified using the user operation unit 22 is supplied to the color data extraction unit 12.

The color data extraction unit 12 extracts a plurality of color data sets in the specified image region from the set of the pre-conversion images and the post-conversion images, which is acquired by the image data acquisition unit 10, when information on the image region which is specified using the user operation unit 22 is input. The color data extraction unit 12 basically extracts color data sets in the region of interest as discussed already. It should be noted, however, that the color data extraction unit 12 extracts a plurality of color data sets in the specified image region, rather than the region of interest. The color data extraction unit 12 supplies the newly extracted color data sets to the color conversion model preparation unit 14.

The color conversion model preparation unit 14 relearns the color conversion model which is stored in the model storage unit 16 using the color data sets which are newly extracted by the color data extraction unit 12 as new teacher data, and stores the learned color conversion model in the model storage unit 16.

Color conversion of the sample image 30 by the color conversion unit 18, specification of an image region in which a tone jump is caused by the user operation unit 22, extraction of color data sets in the specified image region by the color data extraction unit 12, and relearning of the color conversion model by the color conversion model preparation unit 14 may be repeatedly executed a necessary number of times. Consequently, a color conversion model that does not cause a tone jump is finally prepared and stored in the model storage unit 16.

Figure 2:
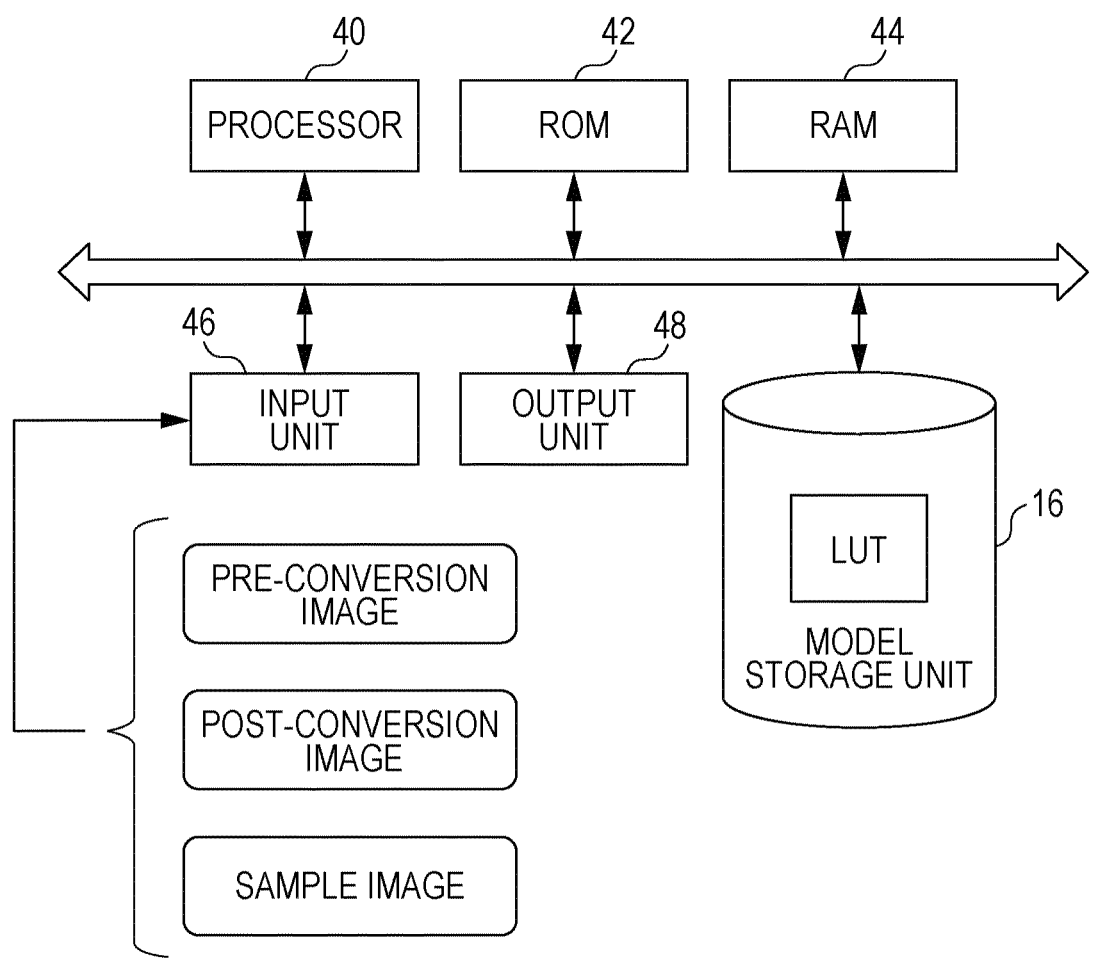
FIG. 2 is a block diagram illustrating the configuration of the image processing apparatus according to the exemplary embodiment.

FIG. 2 is a block diagram illustrating the configuration of the image processing apparatus according to the present exemplary embodiment. The image processing apparatus is constituted of a computer, and includes a processor 40, a read only memory (ROM) 42, a random access memory (RAM) 44, an input unit 46, an output unit 48, and the model storage unit 16.

The processor 40 implements the image data acquisition unit 10, the color data extraction unit 12, the color conversion model preparation unit 14, and the color conversion unit 18 in FIG. 1 by reading a process program stored in the ROM 42 or a different program memory and executing the process program using the RAM 44 as a work memory.

The input unit 46 is constituted from a keyboard, a mouse, a scanner, a touch screen, a communication interface, etc., and receives a set of pre-conversion images and post-conversion images designated by the user, and receives a sample image. The input unit 46 functions as the user operation unit 22 in FIG. 1.

The output unit 48 is constituted of a display device etc. that includes a touch screen, and outputs a post-conversion image 28 that has been subjected to color conversion by the processor 40. The output unit 48 outputs a sample image after color conversion that has been subjected to color conversion by the processor 40 in the case where a sample image is input. The user visually recognizes the sample image after color conversion, checks whether or not a tone jump is caused, and operates the input unit 46 to specify an image region in which the tone jump is caused. In the case where the output unit 48 is constituted of a touch screen, the user may touch and specify an image region in which the tone jump is caused. The output unit 48 may also include a communication interface, and may output the post-conversion image 28 to a different computer via a communication line.

As discussed already, the model storage unit 16 stores a color conversion model. The color conversion model is expressed as a three-dimensional LUT, for example. The processor 40 prepares a color conversion model by inputting a set of pre-conversion images and post-conversion images, which has been input, to a learning unit as teacher data. The learning unit may be a neural network (NN), a convolutional neural network (CNN), etc., for example, but is not limited to a particular model.

When a sample image is input from the input unit 46 after preparing a color conversion model and storing the color conversion model in the model storage unit 16, the processor 40 reads the color conversion model from the model storage unit 16, performs color conversion, and outputs the converted image to the output unit 48 to be displayed. When the user specifies an image region in which a tone jump is caused, the processor 40 extracts color data sets for the specified image region from the teacher data, relearns the color conversion model using new color data sets with the color data sets for the specified image region added thereto, and stores the relearned color conversion model in the model storage unit 16 again.

The processor 40 may repeatedly execute relearning of the color conversion model until the user determines that no tone jump is caused. The image processing apparatus may determine, in place of the user, the presence or absence of a tone jump (e.g. determine that a tone jump is caused by detecting that the lightness is not varied monotonously), and repeatedly execute such determination until no tone jump is detected. Alternatively, an upper limit may be set for the number of repetitions, and the determination may be repeatedly executed within the range of the upper limit.

In the present exemplary embodiment, it is not necessary that the image processing apparatus should include the model storage unit 16, and an external server etc. may include the model storage unit 16. In this case, when the processor 40 prepares a color conversion model, the processor 40 stores the prepared color conversion model in a model storage device of the external server etc. via a communication interface and a communication line. In the case where a sample image is input, the processor 40 reads the corresponding color conversion model from the model storage device of the external server, performs color conversion, and outputs the resulting color conversion model to the output unit 48.

While the processor 40 prepares a color conversion model and executes color conversion using the prepared color conversion model, a processor that prepares (including relearning) a color conversion model and a processor that performs color conversion using the color conversion model may be separate from each other. Rather than including both a function of preparing a color conversion model and a function of executing color conversion using the color conversion model and outputting the resulting color conversion model, the image processing apparatus according to the present exemplary embodiment may include only a function of preparing (including re-learning) a color conversion model or only a function of executing color conversion using the color conversion model and outputting the resulting color conversion model.

The processor 40 refers to hardware in a broad sense. Examples of the processor 40 include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The term "processor" is broad enough to encompass one processor or plural processors in collaboration which are located physically apart from each other but may work cooperatively. The order of operations of the processor is not limited to one described herein, and may be changed.

<Process Flowchart>

Figure 3:
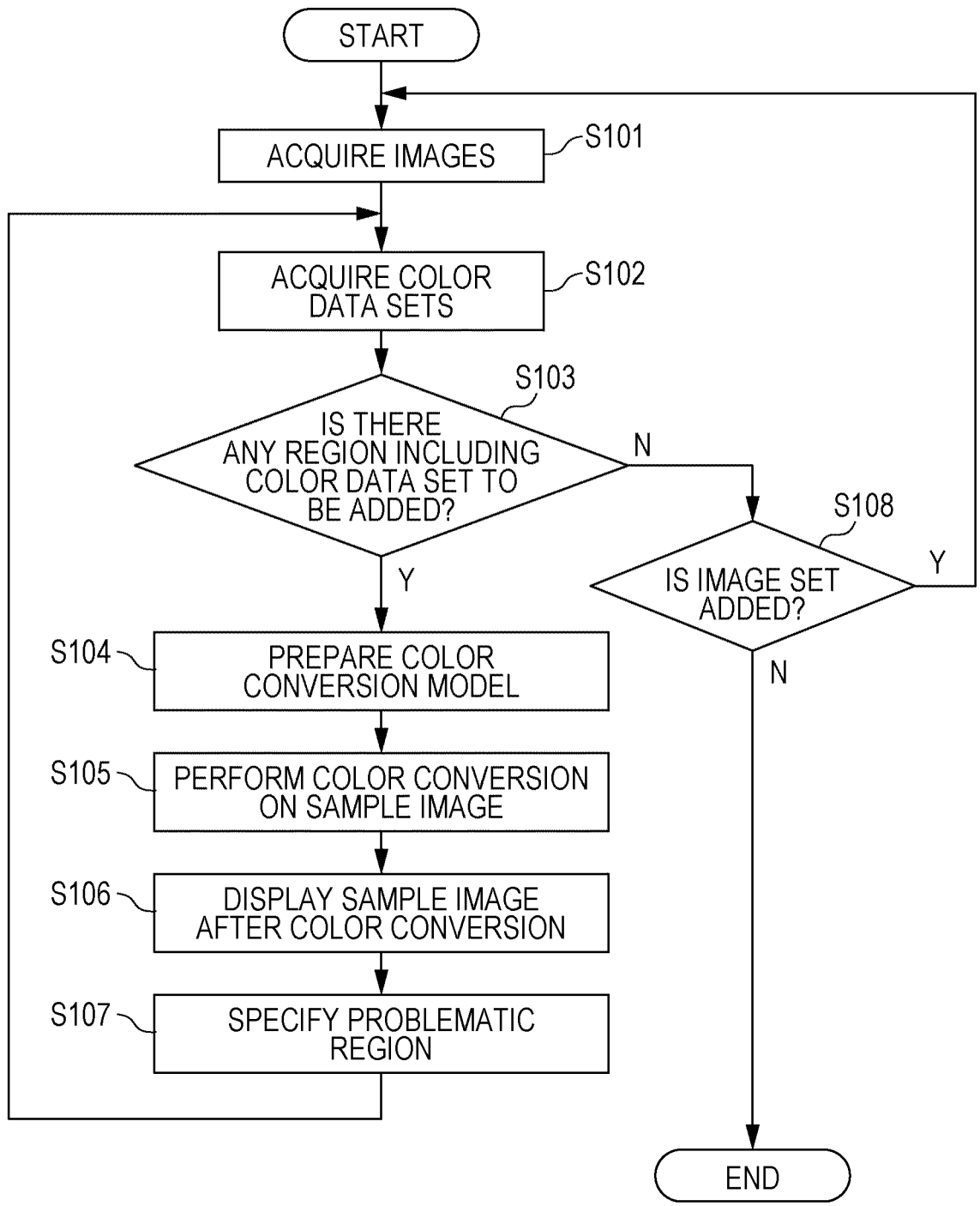
FIG. 3 is a process flowchart according to the exemplary embodiment.

FIG. 3 is a process flowchart according to the exemplary embodiment. In particular, the drawing illustrates a process of preparing a color conversion model.

First, the processor 40 acquires sets of image information to serve as teacher data (S101). The sets of image information are sets of pre-conversion images and post-conversion images. It is desirable to acquire as many sets as possible.

Next, a plurality of color data sets in a region of interest are extracted and acquired from the plurality of sets of pre-conversion images and post-conversion images (S102). That is, the color data extraction unit 12 extracts data sets including color data in a region of interest of the pre-conversion images (i.e. color data before color conversion) and color data in the same region of interest of the post-conversion images (i.e. color data after color conversion). The region of interest may be a region designated by the user, or may be a specific image region set in advance. The region of interest may be set as a region of interest in a pre-conversion image, and may be set as a region of interest in a post-conversion image. That is, the region of interest may be set in one of a pre-conversion image and a post-conversion image. In the case where color conversion is performed for a portion of a garment as a commodity, the portion of the garment may be set as the region of interest. It is required that the color of a commodity should be subjected to more strict color reproduction, and that the color of the actual commodity and the color of the commodity displayed as an image should coincide with each other. Therefore, the color of a commodity tends to be subjected to color conversion.

Next, it is determined whether or not there is any image region that includes a color data set to be added (S103). By default, an affirmative determination (YES) is made, considering that there is any image region that includes a color data set to be added. In this determination process, a negative determination (NO) is made in the case where it is determined that no tone jump is caused when the user visually recognizes the sample image after color conversion to be discussed later.

By default, an affirmative determination (YES) is made in S103. Next, the processor 40 prepares a color conversion model (S104) by performing machine learning using the color data sets which are acquired in S102 as teacher data. In the case where the color conversion model is prescribed by a three-dimensional LUT, the model converts (Ra, Ga, Ba) into (Rb, Gb, Bb) as:

(Ra, Ga, Ba)→(Rb, Gb, Bb)

The three-dimensional LUT is a discrete table. Thus, a continuous color conversion function may be obtained by interpolating color data that are not prescribed by the three-dimensional LUT through linear interpolation or non-linear interpolation. The prepared color conversion model is stored in the model storage unit 16.

Next, the processor 40 receives a sample image, e.g. a gradation image in a plurality of colors, as an input, and performs color conversion on the sample image using the prepared color conversion model (S105).

Figure 4:
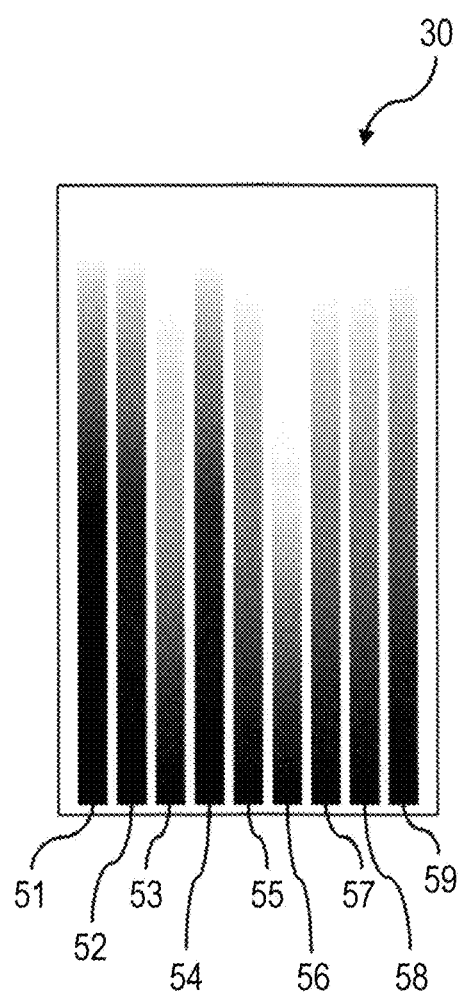
FIG. 4 illustrates a sample image according to the exemplary embodiment.

FIG. 4 illustrates an example of the sample image 30. The sample image 30 is an image that allows checking of the precision of a color conversion model, and a color chart in which a plurality of colors are arranged in accordance with specific rules. In FIG. 4, bars 51 to 59 in different colors are printed on the sample image 30, with the lightness of each of the bars 51 to 59 becoming continuously lower from the upper side toward the lower side. In FIG. 4, the bar 51 is blue, the bar 52 is purple, the bar 53 is magenta, the bar 54 is red, the bar 55 is brown, the bar 56 is yellow, the bar 57 is green, the bar 58 is cyan, and the bar 59 is black. However, the color arrangement is not limited thereto. The sample image 30 may be determined in advance, or may be changed in color, i.e. hue and lightness, as desired by the user.

Returning to FIG. 3, after performing color conversion on the sample image using the color conversion model, the processor 40 outputs the sample image after color conversion to the output unit 48 to be displayed (S106).

The user visually recognizes the sample image after color conversion being displayed, and checks whether or not a tone jump is caused. If a tone jump is caused, an image region in which the tone jump is caused is specified as a problematic region (S107).

The processor 40 acquires a color data set for the specified image region (S102). That is, color data for an image region in the sample image before color conversion corresponding to the specified image region in the sample image after color conversion are acquired, and a color data set corresponding to the acquired color data is extracted from the plurality of sets of pre-conversion images and post-conversion images which are acquired in S101. An affirmative determination (YES) is made in S103 again. The color conversion model is relearned (S104) using the color data set which is newly acquired in S102 as teacher data.

The processor 40 receives a sample image, e.g. a gradation image in a plurality of colors, as an input again, and performs color conversion on the sample image using the color conversion model which has been relearned and prepared again (S105). After performing color conversion on the sample image using the relearned color conversion model, the processor 40 outputs the sample image after color conversion to the output unit 48 again to be displayed (S106).

The user visually recognizes the sample image after color conversion being displayed again, and checks whether or not a tone jump is caused. If a tone jump is caused, an image region in which the tone jump is caused is specified as a problematic region (S107). After that, the same processes are repeatedly performed.

In the case where the user finds that no tone jump is caused, on the other hand, no problematic region is specified. At this time, the processor 40 does not extract a new color data set (S102). Since no new color data set is extracted, a negative determination (NO) is made in S103, and it is determined whether or not an image set is added (S108).

This image set means a new set of images other than the plurality of sets of pre-conversion images and post-conversion images which are acquired in S101. If there is any such image set, the processes in and after S101 are repeatedly performed again to prepare a color conversion model again. If there is no new image set, a negative determination (NO) is made in S108, and the process is ended. The color conversion model which is stored in the model storage unit 16 at this time is the final color conversion model. When the user inputs an image to be subjected to color conversion, the processor 40 performs color conversion using the color conversion model which is stored in the model storage unit 16 at this time, and outputs the resulting post-conversion image to the output unit 48.

FIG. 5 is a different process flowchart according to the exemplary embodiment.

First, the processor 40 acquires sets of image information to serve as teacher data (S201). The sets of image information are sets of pre-conversion images and post-conversion images. It is desirable to acquire as many sets as possible.

Next, a plurality of color data sets in a region of interest are extracted and acquired from the plurality of sets of pre-conversion images and post-conversion images (S202). That is, the color data extraction unit 12 extracts data sets including color data in a region of interest of the pre-conversion images (i.e. color data before color conversion) and color data in the same region of interest of the post-conversion images (i.e. color data after color conversion). The region of interest may be a region designated by the user, or may be a specific image region set in advance. The region of interest may be set as a region of interest in a pre-conversion image, and may be set as a region of interest in a post-conversion image. That is, the region of interest may be set in one of a pre-conversion image and a post-conversion image. In the case where color conversion is performed for a portion of a garment as a commodity, the portion of the garment may be set as the region of interest. It is required that the color of a commodity should be subjected to more strict color reproduction, and that the color of the actual commodity and the color of the commodity displayed as an image should coincide with each other. Therefore, the color of a commodity tends to be subjected to color conversion.

Next, the processor 40 prepares a color conversion model (S203) by performing machine learning using the color data sets which are acquired in S202 as teacher data. In the case where the color conversion model is prescribed by a three-dimensional LUT, the model converts (Ra, Ga, Ba) into (Rb, Gb, Bb) as:

(Ra, Ga, Ba)→(Rb, Gb, Bb)

The three-dimensional LUT is a discrete table. Thus, a continuous color conversion function may be obtained by interpolating color data that are not prescribed by the three-dimensional LUT through linear interpolation or non-linear interpolation. The prepared color conversion model is stored in the model storage unit 16.

Next, the processor 40 receives a sample image, e.g. a gradation image in a plurality of colors, as an input, and performs color conversion on the sample image using the prepared color conversion model (S204).

Next, after performing color conversion on the sample image using the color conversion model, the processor 40 outputs the sample image after color conversion to the output unit 48 to be displayed (S205).

Next, the processor 40 determines whether or not a tone jump is caused in the sample image after color conversion being displayed (S206). If a tone jump is caused, an image region in which the tone jump is caused is specified (S207). S206 and S207 may be performed by the user making manual input using the input unit 46.

The processor 40 acquires a color data set for the specified image region (S202). That is, color data for an image region in the sample image before color conversion corresponding to the specified image region in the sample image after color conversion are acquired, and a color data set corresponding to the acquired color data is extracted from the plurality of sets of pre-conversion images and post-conversion images which are acquired in S201. The color conversion model is relearned (S203) using the color data set which is newly acquired in S202 as teacher data.

The processor 40 receives a sample image, e.g. a gradation image in a plurality of colors, as an input again, and performs color conversion on the sample image using the color conversion model which has been relearned and prepared again (S204). After performing color conversion on the sample image using the relearned color conversion model, the processor 40 outputs the sample image after color conversion to the output unit 48 again to be displayed (S205).

Next, the processor 40 determines whether or not a tone jump is caused in the sample image after color conversion being displayed again (S206). If a tone jump is caused, an image region in which the tone jump is caused is specified (S207). S206 and S207 may be performed by the user making manual input using the input unit 46. If a tone jump is caused, an image region in which the tone jump is caused is specified (S207). After that, the same processes are repeatedly performed.

In the case where no tone jump is caused (NO in S206), on the other hand, the processor 40 determines whether or not an image set is added (S108). This image set means a new set of images other than the plurality of sets of pre-conversion images and post-conversion images which are acquired in S201. If there is any such image set, the processes in and after S201 are repeatedly performed again to prepare a color conversion model again. If there is no new image set, a negative determination (NO) is made in S208, and the process is ended.

Figure 6A:
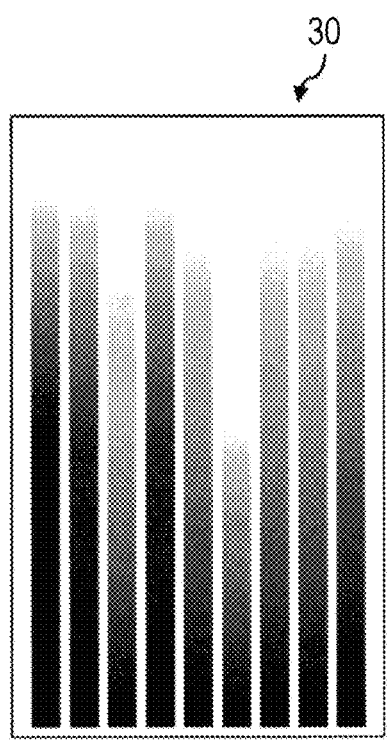
FIGS. 6A and 6B illustrate a sample image before color conversion and a sample image after color conversion, respectively, according to the exemplary embodiment.
Figure 6B:
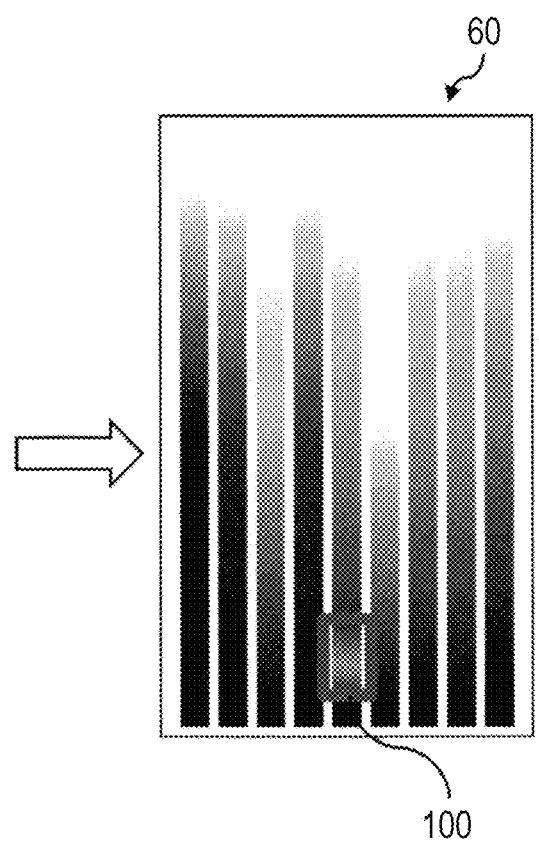

FIGS. 6A and 6B illustrate an example of a sample image 30 before color conversion and a sample image 60 after color conversion, respectively. FIG. 6A illustrates the sample image 30 before color conversion, which is a gradation image in a plurality of colors that is identical to the sample image 30 illustrated in FIG. 4. FIG. 6B illustrates the sample image 60 which has been subjected to color conversion performed using a color conversion model, and in which a tone jump at which the lightness is not varied monotonously is caused in a partial image region 100. The user may specify the image region 100 as a rectangular region using a mouse etc., by performing a drag operation with the mouse using a region setting tool etc.

FIG. 7 schematically illustrates a process for the case where the user specifies the image region 100 in FIG. 6. The processor 40 specifies an image region 200 in the sample image 30 before color conversion corresponding to the specified image region 100 in the sample image 60 after color conversion, and extracts color data on a group of pixels that constitute the image region 200. The extracted color data are defined as (Rs, Gs, Bs). The processor 40 extracts a color data set corresponding to the extracted color data (Rs, Gs, Bs) from the plurality of sets of pre-conversion images and post-conversion images which are input in preparing a color conversion model.

That is, when the plurality of sets of pre-conversion images Pa and post-conversion images Pb are (pre-conversion image: post-conversion image)=(Pa1, Pb1)
(Pa2, Pb2)
(Pa3, Pb3)
. . .
(Pai, Pbi)
(Paj, Pbj)

and color data in a pre-conversion image corresponding to the color data (Rs, Gs, Bs) which are extracted from the sample image 30 before color conversion are present in Pai, the processor 40 extracts (Pai, Pbi)

as a set of a pre-conversion image and a post-conversion image, and extracts (Rai, Gai, Bai): (Rbi, Gbi, Bbi)

which is a color data set that is present in such a set of images and that coincides with the color data (Rs, Gs, Bs), as a new color data set. More particularly, color data (Rai, Gai, Bai) which coincide with the color data (Rs, Gs, Bs) are extracted from the pre-conversion image Pai, to extract color data (Rbi, Gbi, Bbi) on the post-conversion image Pbi which are obtained by performing color conversion on the extracted color data (Rai, Gai, Bai) on the pre-conversion image Pai. A plurality of sets of images (Pai, Pbi) may be extracted. A plurality of color data sets (Rai, Gai, Bai): (Rbi, Gbi, Bbi) may be extracted from a plurality of image regions in the extracted sets of images (Pai, Pbi). It should be noted, however, that not the color data extracted from the sample image 30 before color conversion but color data sets in the teacher data corresponding to such color data are extracted.

The processor 40 may extract color data on a group of pixels that constitute the image region 100 which is specified in the sample image 60 after color conversion, extract color data on images after color conversion in the teacher data corresponding to the extracted color data, and further extract color data on images before color conversion corresponding to the extracted color data to obtain color data sets, instead of specifying an image region 200 in the sample image 30 before color conversion corresponding to the specified image region 100 in the sample image 60 after color conversion and extracting color data on a group of pixels that constitute the image region 200.

Figure 8A:
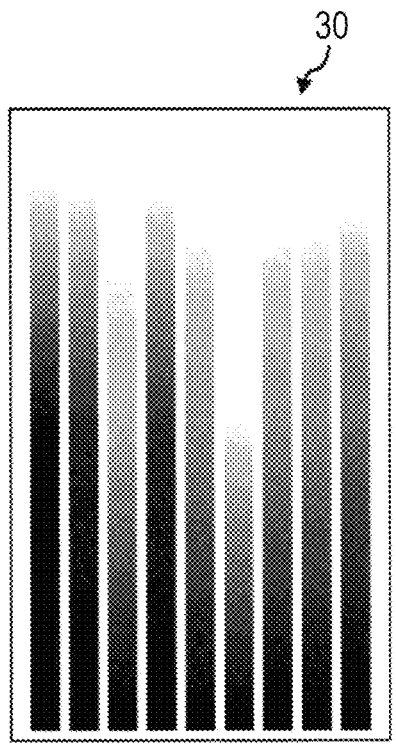
FIGS. 8A to 8D illustrate extraction of a color data set from teacher data according to the exemplary embodiment.
Figure 8B:
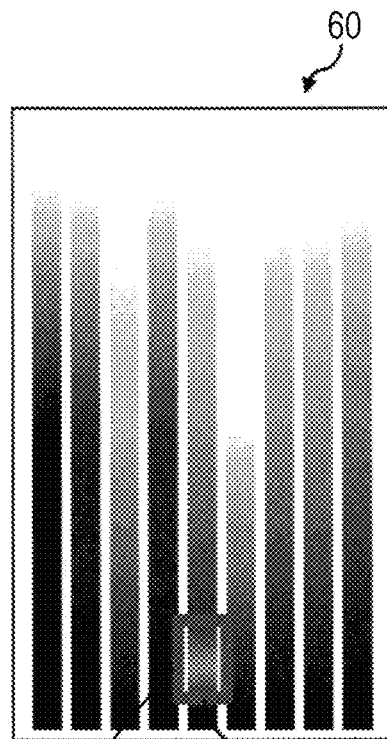
Figure 8C:
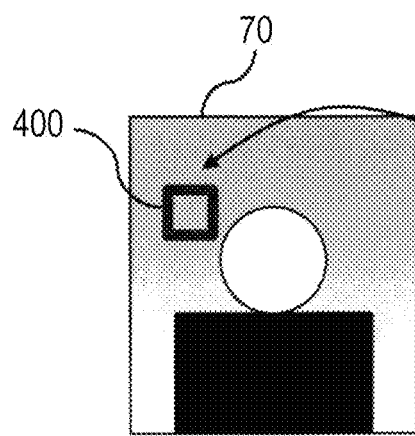
Figure 8D:
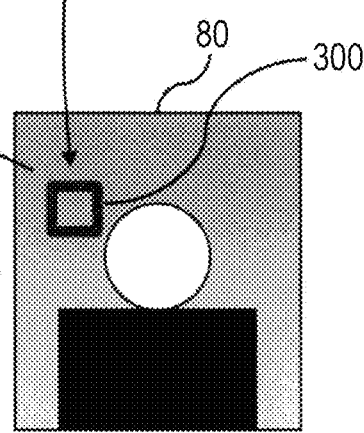

FIGS. 8A to 8D schematically illustrate a process for this case. FIG. 8A illustrates the sample image 30 before color conversion, which is a gradation image in a plurality of colors that is identical to the sample image 30 illustrated in FIG. 4. FIG. 8B illustrates the sample image 60 which has been subjected to color conversion performed using a color conversion model, and in which a tone jump at which the lightness is not varied monotonously is caused in a partial image region 100. FIGS. 8C and 8D illustrate an example of an image before color conversion 70 and an image after color conversion 80 that constitute the teacher data. The processor 40 extracts color data on a group of pixels that constitute the image region 100. The extracted color data are defined as (Rt, Gt, Bt). The processor 40 extracts a color data set corresponding to the extracted color data (Rt, Gt, Bt) from the plurality of sets of pre-conversion images and post-conversion images which are input in preparing a color conversion model.

That is, when the plurality of sets of pre-conversion images Pa and post-conversion images Pb are (pre-conversion image: post-conversion image)=(Pa1, Pb1)
(Pa2, Pb2)
(Pa3, Pb3)
. . .
(Pai, Pbi)
(Paj, Pbj)

and color data in a post-conversion image corresponding to the color data (Rt, Gt, Bt) which are extracted from the sample image 60 after color conversion are present in Pbi, the processor 40 extracts (Pai, Pbi)

as a set of a pre-conversion image and a post-conversion image, and extracts (Rai, Gai, Bai): (Rbi, Gbi, Bbi)

which is a color data set that is present in such a set of images and that coincides with the color data (Rt, Gt, Bt), as a new color data set. In the drawings, the pre-conversion image Pai corresponds to the image before color conversion 70, and the post-conversion image Pbi corresponds to the image after color conversion 80. If an image region in the image after color conversion 80 with color data (Rbi, Gbi, Bbi) is an image region 300, color data in an image region 400 in the image before color conversion 70 correspond to such color data.

In the case where there is no color data set in the teacher data corresponding to the extracted color data on the sample image 30 before color conversion, the process may be ended, or a color data set in the teacher data that is the most similar to the extracted color data on the sample image 30 before color conversion may be extracted in an alternative process. The most similar color data may be selected by calculating a color difference. The color difference is the distance in a color space, and is calculated as a Euclidean distance. In the case where the color space is constituted from RGB, the color difference is calculated in the color space which is constituted as a linear three-dimensional space with R, G, and B. Alternatively, in the Lab space, the distance between two color data (L1, a1, b1) and (L2, a2, b2) may be calculated as:

$$\Delta E = \{(L1-L2)^2 + (a1-a2)^2 + (b1-b2)^2\}^{0.5}$$

In the present exemplary embodiment, as described above, the sample image 30 is subjected to color conversion performed using a color conversion model prepared through machine learning using teacher data, and the color conversion model is relearned in the case where a tone jump is caused in the sample image 60 after color conversion In the present exemplary embodiment, in addition, the color conversion model is relearned using a color data set (a set of color data before color conversion and color data after color conversion) in the teacher data corresponding to color data that constitute an image region in which the tone jump is caused.

In the present exemplary embodiment, the process performed by the processor 40 in the case where a tone jump is caused is exemplified by the following two processes: Process A, which includes (1) specifying an image region 100 in which the tone jump is caused from a sample image 60 after color conversion,
(2) specifying an image region 200 in a sample image 30 before color conversion corresponding to the image region 100,
(3) specifying color data in the image region 200,
(4) specifying color data in a pre-conversion image 70 in teacher data, and
(5) specifying color data in a post-conversion image 80 corresponding to the color data which are specified in the pre-conversion image 70, to acquire a color data set; and Process B, which includes
(1) specifying an image region 100 in which the tone jump is caused from a sample image 60 after color conversion,
(2) specifying color data in a post-conversion image 80 in teacher data corresponding to the image region 100, and
(3) specifying color data in a pre-conversion image 70 corresponding to the color data which are specified in the post-conversion image 80, to acquire a color data set. The user may relearn the color conversion model by selecting one of the process A and the process B as desired, or combining such processes as appropriate.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
an input device to which images before color conversion and images after color conversion are input; and
a processor,
wherein the processor is configured to execute a program to
perform color conversion on a sample image using color conversion characteristics prepared by inputting sets of the images before color conversion and the images after color conversion to the input device,
specify a portion at which a tone jump is caused in the sample image after color conversion,
acquire, from the sets, a set of an image before color conversion and an image after color conversion corresponding to the portion at which the tone jump is caused; and
prepare the color conversion characteristics again using the acquired set of images.

2. The image processing apparatus according to claim 1, wherein the processor is configured to
specify a color that is used at the portion at which the tone jump is caused,
extract an image after color conversion that is not the sample image and that has been subjected to color conversion performed using the specified color, and
prepare the color conversion characteristics again using the extracted image after color conversion and an image before color conversion that constitutes a set with the extracted image after color conversion.

3. The image processing apparatus according to claim 2, wherein the processor is configured to extract, for each color that is used at the portion at which the tone jump is caused, a set of an image after color conversion that is not the sample image and that has been subjected to color conversion performed using the specified color and an image before color conversion, and input each extracted set of images to the input device.

4. The image processing apparatus according to claim 1, further comprising:
a display device,
wherein the processor is configured to perform color conversion on an input image before color conversion using the color conversion characteristics that have been prepared again, and display a resulting image on the display device as an image after color conversion.

5. The image processing apparatus according to claim 1, wherein the processor is configured to specify the portion at which the tone jump is caused, in accordance with a user operation.

6. The image processing apparatus according to claim 1, wherein the processor is configured to specify the portion at which the tone jump is caused, by detecting a portion at which lightness is not varied monotonously.

7. The image processing apparatus according to claim 1, wherein the sample image is a gradation image including a plurality of colors.

8. The image processing apparatus according to claim 2, wherein the sample image is a gradation image including a plurality of colors.

9. The image processing apparatus according to claim 3, wherein the sample image is a gradation image including a plurality of colors.

10. The image processing apparatus according to claim 4, wherein the sample image is a gradation image including a plurality of colors.

11. The image processing apparatus according to claim 5, wherein the sample image is a gradation image including a plurality of colors.

12. The image processing apparatus according to claim 6, wherein the sample image is a gradation image including a plurality of colors.

13. A non-transitory computer readable medium storing a program causing a computer to execute a process comprising:
performing color conversion on a sample image using color conversion characteristics prepared by inputting sets of images before color conversion and images after color conversion to an input device;
specifying a portion at which a tone jump is caused in the sample image after color conversion;
acquiring, from the sets, a set of an image before color conversion and an image after color conversion corresponding to the portion at which the tone jump is caused; and
preparing the color conversion characteristics again using the acquired set of images.

14. An image processing apparatus comprising:
input means to which images before color conversion and images after color conversion are input; and
processing means,
wherein the processing means is configured to execute a program to
perform color conversion on a sample image using color conversion characteristics prepared by inputting sets of the images before color conversion and the images after color conversion to the input means,
specify a portion at which a tone jump is caused in the sample image after color conversion, and
acquire, from the sets, a set of an image before color conversion and an image after color conversion corresponding to the portion at which the tone jump is caused; and
prepare the color conversion characteristics again using the acquired set of images.

* * * * *